United States Patent Office 3,041,316
Patented June 26, 1962

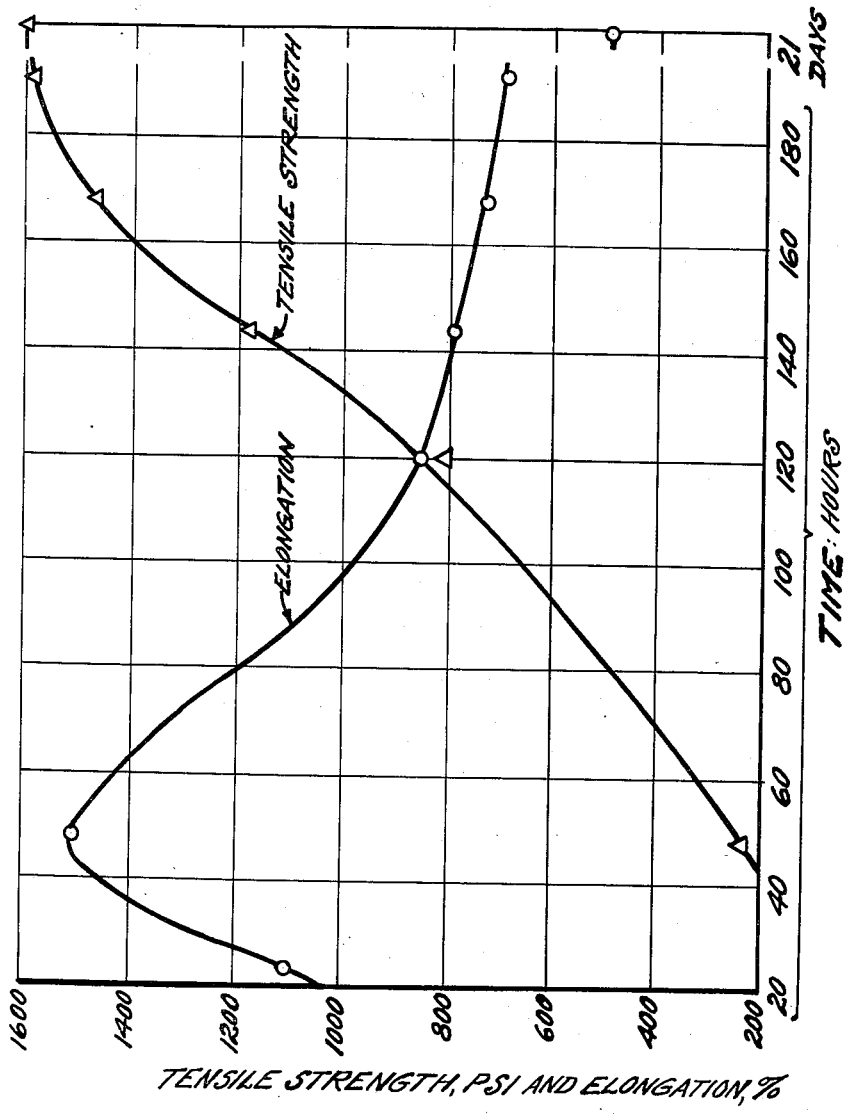

3,041,316
ROOM TEMPERATURE VULCANIZATION OF FLUORINATED HYDROCARBON ELASTOMERS
Warren R. Griffin, Dayton, Ohio, assignor to the United States of America as represented by the United States Air Force
Filed Oct. 9, 1959, Ser. No. 845,579
13 Claims. (Cl. 260—79)
(Granted under Title 35, U.S. Code (1952), sec. 266)

The invention described herein may be manufactured and used by or for the United States Government for governmental purposes without payment to me of any royalty thereon.

This invention relates to the vulcanization of elastomers and more particularly relates to the room temperature vulcanization of fluorinated hydrocarbon elastomeric polymers suitable for use in high temperature resistant fuel tank and vehicle structure sealants for supersonic aircraft and missiles. In a more specific aspect this invention relates to a method of vulcanizing selected fluorine-containing copolymers by first providing chemically reactive sites on the copolymers at elevated temperatures followed by cross-linking through these sites at room temperatures.

Various types of elastomeric materials have been employed as fuel tank sealants. However, with the advent of high speed aircraft and missiles, it was necessary that sealant materials be developed which would be fluid resistant, resistant to elevated temperatures in the range of 500°–600° F. and be capable of vulcanization at room temperatures. Room temperature vulcanization is a necessary feature of the polymeric liquids used as sealants for without this feature delicate electronic equipment, wing and cabin structures, and perhaps whole aircraft would have to be subject to harmful exposure to conventionally high vulcanization temperatures during manufacture. While such exposures are not impossible, the need for high vulcanization temperatures has discouraged the use of many elastomeric polymers which would otherwise have provided a suitable basis for sealant materials.

Previously, subsonic aircraft employed sealant materials based on liquid polysulfide elastomers which were generally satisfactory. However, they were limited in thermal stability to 275° F. and under present day operating conditions the need for sealant materials resistant at temperature ranges of 500°–600° F. is urgent.

The halogenated hydrocarbon elastomers, as is well known, possess the necessary thermal stability and fluid resistance for high temperature sealant applications. However, prior to this invention the fluorinated elastomers required 300° and 400° F. temperatures with applied pressures for complete vulcanization.

Accordingly, it is an object of this invention to circumvent the above-described limitations so as to produce a sealant material which will operate effectively in high speed aircraft and missiles.

Another object of this invention is to provide a process for producing a class of vulcanizable elastomeric halogen-containing polymers capable of being vulcanized at room temperatures.

A further object of this invention is to provide room temperature vulcanizable elastomeric halogen-containing polymers having thermal stability at elevated temperatures.

A still further object of this invention is to provide a class of room temperature vulcanizable elastomeric halogen-containing polymers having fluid resistance.

Still another object of this invention is to provide a class of compositions useful as potting compounds for electronic equipment and as sealant materials in subsonic aircraft.

The above and still other objects, advantages, and features of this invention will become apparent upon consideration of the following detailed description of specific embodiments thereof, especially when taken in conjunction with the accompanying drawing which is a graph illustrating the properties of a vulcanizate produced by this invention.

It has been found, in accordance with the invention, that the aforestated objects are accomplished by first providing chemically reactive sites at elevated temperatures on selected halogenated hydrocarbon polymers followed by vulcanization at room temperature with a polyfunctional compound. The halogenated hydrocarbon polymers found to be of special value in this invention are the halogenated alkyl-vinylidene fluoride copolymers which, as is well known, are not easily attacked at room temperature by cross-linking agents capable of complete reaction. Accordingly, it was found that by providing chemically reactive sites or "handles" on the polymer chain at elevated temperatures, room temperature vulcanization could be effected by reacting the modified polymer with polyfunctional cross-linking agents. The formation of the reactive sight is the first step and is accomplished by using various amines.

The amines which can be employed in this invention are primary amines such as ethylamine, propylamine and the like; secondary amines such as diethylamine, diisopropylamine, di-n-butylamine, diisobutylamine, di-n-octylamine, diallylamine, and the like; and tertiary amines such as triethylamine, tripropylamine, triamylamine, tetramethylguanidine, and the like. The methyl homologs of the primary secondary and tertiary amines undergo rearrangement or decomposition and produce a cross-linked product during the site formation reaction. Therefore, the methyl homologs are not useful under the conditions described herein. It is theorized that these agents provide reactive sites in the halogenated polymer such as commercially available Viton A (a copolymer of hexafluoropropylenevinylidene fluoride). All of these amines provide double bonds on the polymer chain and in the case of the unsaturated primary and secondary amines the double bonds of the amines are additional active sites. Examples of theorized reactive sites are illustrated as follows:

CASE I.—PRIMARY SATURATED AMINES

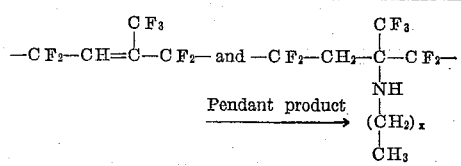

CASE II.—PRIMARY UNSATURATED AMINES

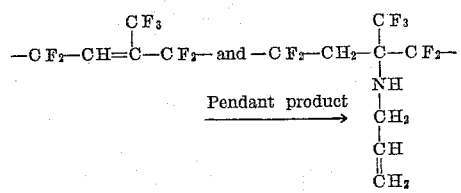

CASE III.—SATURATED SECONDARY AMINES

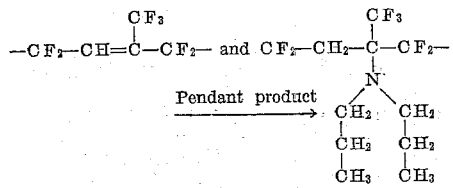

CASE IV.—UNSATURATED SECONDARY AMINES

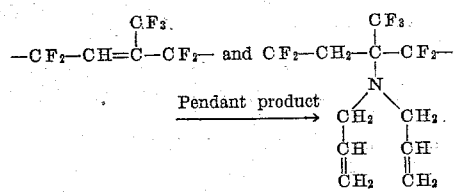

CASE V.—TERTIARY AMINES

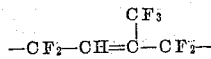

The following equation illustrates the reactive site formation with diallylamine:

REACTION NO. 1.—REACTIVE SITE FORMATION FOR CASE IV

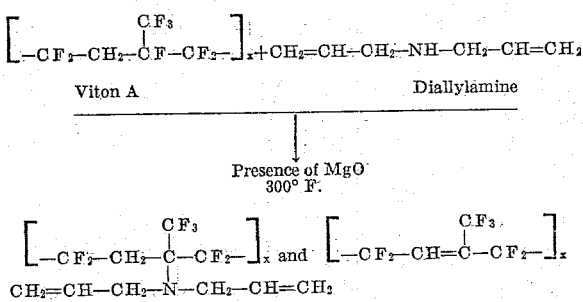

The reaction was conducted in the presence of magnesium oxide at 300° F. for 2 hours in the confined cavity of a rubber mold. Although wide temperature ranges may be employed in the foregoing reaction, a temperature range of approximately 250° to 310° F. is preferred. Lower temperature ranges give a reaction too slow to be of particular value while the higher temperature ranges in excess of 320° F. give undesirable cross-linking.

Following the formation of the reactive sites, the modified fluorinated polymer was vulcanized by employing polyfunctional cross-linking agents active toward the modified polymer and capable of reaction at room temperature. Examples of cross-linking agents suitable in the present invention are dimercaptans such as hexamethylene dithiol and glycol dimercapto-acetate; heterocyclic amines such as piperazine; and alkane diamines such as N,N' dimethyl hexamethylene diamine, which are di-secondary amines with a methyl group at each opposite end of the molecule. A possible explanation of the room temperature vulcanization of the modified fluorinated polymer is exemplified in the following reactions:

REACTION NO. 2.—CROSS-LINK FORMATION FOR CASE IV

Polymer with active sites

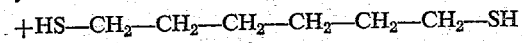

Hexamethylene dithiol

Presence of tri-n-amylamine and moisture at 75° F.

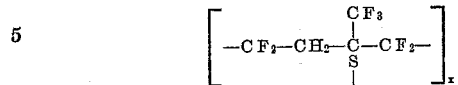

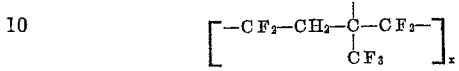

and

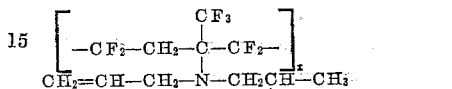

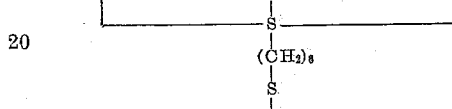

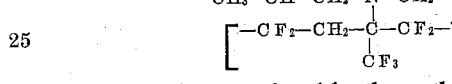

The vulcanizate produced by the method of this invention and illustrated by the foregoing theoretical reactions showed excellent thermal stability at 400° F. which stability will be hereinafter demonstrated in greater detail. However, the products prepared using saturated and unsaturated primary amines and tertiary amines appeared to be inferior to the unsaturated and saturated secondary amines during thermal stability tests. The pendant product of the primary amines are activated at elevated temperatures causing undesirable hardening of the elastomer. The tertiary amines do not form pendant groups and are therefore free to continue the dehydrohalogenation reaction until decomposed or volatilized from the polymer mass.

The following examples, in which parts given are by weight, further illustrate the principles involved in this invention. Example 1 shows a representative solvent based fluorinated elastomeric polymer vulcanized in accordance with this invention. However, it is to be clearly understood that true liquid polymers are equally operative within the scope of this invention. The purpose of the solvent is to provide a liquid system from the dry polymers, which is preferable for application as fuel tank sealants. The subsequent examples are presented to further illustrate this invention so that those skilled in the art may better understand the invention and the method by which the same may be carried into effect.

EXAMPLE 1

A vulcanizate having the following composition was prepared. The composition was separated into two parts, for storage stability, as shown in the following formulation.

Part A: Parts by weight
Viton A [1] _____ 100.00
Medium thermal carbon black_____ 30.00
Magnesium oxide_____ 10.00
Diallylamine _____ 1.00
Methyl ethyl ketone_____ 141.00

Part B:
Hexamethylene dithiol_____ 1.50
Tri-n-amylamine _____ 0.50

([1] Viton A is a hexafluoropropylene-vinylidene fluoride copolymer having a molecular weight of about 60,000 and a monomer ratio of 30% vinylidene fluoride and 70% hexafluoropropylene. It is disclosed and more fully described in a pamphlet entitled "Properties of a New Fluorine-Containing Elastomer," Contribution No. 111, Elastomers Laboratory, Organic Chemicals Department, E. I. du Pont de Nemours and Company, Inc.)

The hexafluoropropylene-vinylidene fluoride copolymer is a water clear, rubbery gum which easily forms a band on conventional rubber mixing equipment, hereinafter referred to as a mill. The rubbery gum is banded on a mill with two parallel rolls adjusted to provide a rolling bank in the nip of the rolls. The rear roll rotates faster than the front, causing a shearing action which mixes the rubbery gum with the other ingredients. The remaining ingredients of Part A are weighed using the dry powdered carbon black to absorb the liquid diallylamine. The diallylamine is thereby in a less mobile state and incorporates into the rubber at a faster rate with less danger of loss. The carbon black-diallylamine mix is added to the revolving band and is immediately followed by the magnesium oxide. The mixing action is continued until all the ingredients are uniformly blended. Uniformity is assured by cutting the band from the mill roll, forming a roll of the rubbery mass and end passing this roll through the mill, which is set closer to provide approximately a 0.005 inch separation. During the above mixing, atmospheric conditions prevail except that the mix is cooled by circulating cold water through the hollow mill rolls. The blended rubbery mass, Part A, remains "warm to the touch" from a balance between the cold water cooling effect and the heat generated by the mixing action. The blended rubbery mass is next heated to drive the diallylamine-polymer reaction, under conditions which prevent volatilization of the diallylamine. Two hours at 300° F. are sufficient to drive this reaction, to completion. The volatilization of the diallylamine is prevented by placing the blended rubbery mass in a standard A.S.T.M. cavity mold which has been liberally coated with a surfactant mold release agent. The mold is then placed in a hydraulic press at 300° F. under sufficient pressure to keep it tightly closed. Usually, hydraulic pressures of about 500 pounds per square inch of mold area are sufficient. After a reaction time of two hours the pressure is released and the blended rubbery mass is removed from the mold while hot. The mold release agent and other foreign materials are washed from the mass with cold water. The water is allowed to evaporate. The removal of foreign materials such as are usually encountered in a rubber factory are not likely to interfere with or prevent subsequent reactions but their removal insures a product of more uniform quality. Part A is now refined, as before, by end passing on a tight cool mill in order to break up any agglomerates and to prepare the rubbery mass for rapid attack by the solvent. Generally, ten passes are sufficient and result in a smooth material similar to the original mixture before the heat treatment. The refined material in the form of a thin crumpled sheet is weighed and placed in a container with an equal weight of methyl ethyl ketone solvent. Other solvents may be used such as low molecular weight esters and ketones, tetrahydrofuran and p-dioxane; however, methyl ethyl ketone is readily available and produces a low viscosity solution with Part A.

As indicated in the above formulation, Part B is a physical mixture of hexamethylene dithiol, hereinafter referred to as HMDT and tri-n-amylamine hereinafter referred to as TAA. The HMDT was selected in preference to others because it is in a liquid state and has a low vapor pressure. The TAA was chosen as the catalyst because it is liquid at room temperature, strongly basic and found to have little effect in the vulcanizate after high temperature exposure. The HMDT and TAA are waterlike in appearance and are completely miscible in the proportions used.

The vulcanizate was prepared from a uniform dispersion of Parts A and B in which 1 part by weight of B was mixed into 141 parts by weight of A. In the presence of moisture a cross-linking reaction takes place which leads to a vulcanized elastomer in approximately seven days. The catalyzed solution may be ejected from a pressure gun used for applying sealants, worked into place by using spatulas and the like or flowed out onto a flat sheet of metal or other surface to evaporate the solvent and vulcanize. The rate of the cross-linking reaction depends upon the concentrations of TAA and moisture. In the near absence of moisture TAA does not function as a catalyst; however, normally sufficient moisture is contained by the rubber. The increase of either of the two catalysts TAA or moisture, will result in an increase of rate of reaction. The extent of the cross-linking reaction is dependent upon the number of active sites and how many of these are used in cross-linking. Desirable conditions would provide just enough HMDT to react with all of the reactive sites.

The properties of the vulcanizate were determined during the cross-linking period. A portion of catalyzed solution was flowed out onto a clean steel plate. After it had reacted for 24 hours at room temperature (75° F.±5°) it had sufficient strength to be stripped from the plate. A small part of this flowout was placed in methyl ethylketone. It swelled but did not dissolve, thus indicating that a substantial amount of cross-linking had occurred. The rate of vulcanization at room temperature was traced by measuring tensile strength, percent elongation, hardness and permanent set after break of the specimen. The test specimens were micro-dumbbells measuring ⅛" x ⅝" in the constricted portion, with ½" tabs. The tests except hardness were performed on a modified Twing-Albert paper tensile tester, used because of its sensitivity to small changes in tensile strength. The test data obtained in the above referred to tests are presented in Table I. The tensile strength and percent elongation as a function of time for the room temperature vulcanizate of Example 1 (Viton A) is displayed graphically in the drawing.

*Table I*

RATE OF CROSS-LINKING OF ROOM TEMPERATURE VULCANIZING VITON A

| Time After Catalyzing, hrs. | Tensile Strength, p.s.i. | Elongation, percent | Break Set, percent | Hardness, Shore A |
|---|---|---|---|---|
| 24 | 73 | 1,100 | 240 | 20 |
| 48 | 235 | 1,500 | 260 | 45 |
| 120 | 810 | 850 | 80 | 55 |
| 144 | 1,180 | 790 | 70 | 55 |
| 168 | 1,470 | 730 | 50 | 57 |
| 192 | 1,590 | 700 | 40 | 58 |
| 21 Days | 1,600 | 500 | 20 | 62 |

The test results outlined in Table I indicated a good state of vulcanization after seven days at room temperature. Therefore, test specimens, exhibiting this state of vulcanization were subjected to high temperature tests. Micro-dumbbells, similar to those used in the tests outlined in Table I were exposed to JP-4 jet engine fuel in a pressure bomb at 400° F. for 70 hours. The room temperature vulcanized elastomers of Example I displayed excellent resistance to the hot fluid and also showed little additional vulcanization occurring at this higher temperature. Similar test specimens were exposed to 500° F. air for 70 hours in a circulating air oven.

The results of the foregoing high temperature tests are summarized in Table II.

*Table II*

AGING RESISTANCE OF ROOM TEMPERATURE VULCANIZING VITON A

| Aging Conditions | Tensile Strength, p.s.i. | Elongation, Percent | Hardness, Shore A | Volume Change, Percent |
|---|---|---|---|---|
| Original [1] | 1,500 | 700 | 57 | |
| 70 Hours at 400° F., JP-4 Fuel | 1,800 | 550 | 53 | +7 |
| 70 Hours at 500° F., Air Oven | 1,450 | 320 | 65 | −13 |

[1] Vulcanized 168 hours at room temperature.

The above tests indicate that excellent physical properties are obtained by the room temperature vulcanization system disclosed herein and that a useful fluorinated elastomeric product is produced which fills an urgent need on high speed aircraft.

EXAMPLE 2

Part A: Parts by weight
- Trifluorochloroethylene - vinylidene fluoride copolymer _____ 100.00
- Medium thermal carbon black _____ 30.00
- Magnesium oxide _____ 10.00
- Diallylamine _____ 1.00
- Methyl ethyl ketone _____ 141.00

Part B:
- Hexamethylene dithiol _____ 1.50
- Tri-n-amylamine _____ 0.50

The vulcanization of this example and the subsequent examples, except Example 7, was conducted in accordance with the procedure outlined in Example 1. In Example 7 the 2 hours at 300° F. treatment was done in 3 days at room temperature. The trifluorochloroethylene-vinylidene fluoride copolymer of Example 2, above, is commercially available under the trade name Kel-F and comprises 30 to 50 mole percent of chlorotrifluoroethylene, the remainder being vinylidene fluoride.

EXAMPLE 3

Part A: Parts by weight
- Viton A _____ 100.00.
- Medium thermal carbon black _____ 30.00.
- Magnesium carbonate _____ 20.00.
- Diallylamine hydrochloride _____ 1.00.
- Ethyl acetate _____ Dependent on desired viscosity.

Part B:
- Glycol dimercapto-acetate _____ 1.50.
- Tri-n-amylamine _____ 0.10–0.25. Dependent on desired rate of vulcanization.
- Acetone _____ As needed to make a homogeneous solution.

EXAMPLE 4

Part A: Parts by weight
- Viton A _____ 100.00
- Medium thermal carbon black _____ 30.00
- Magnesium carbonate _____ 10.00
- Diamylamine _____ 1.00
- Methyl ethyl ketone _____ 141.00

Part B: N,N' dimethylhexamethylene diamine _____ 1.50

EXAMPLE 5

Part A:
- Viton A _____ 100.00
- Medium thermal carbon black _____ 30.00
- Magnesium oxide _____ 10.00
- Diallylamine _____ 1.00
- Methyl ethyl ketone _____ 141.00

Part B: Piperazine _____ 1.00

EXAMPLE 6

Part A:
- Viton A _____ 100.00
- Medium thermal carbon black _____ 30.00
- Magnesium oxide _____ 10.00
- Triamylamine _____ 1.00
- Methyl ethyl ketone _____ 141.00

Part B: Piperazine _____ 1.00

EXAMPLE 7

Part A:
- Viton A _____ 100.00
- Medium thermal carbon black _____ 30.00
- Magnesium oxide _____ 10.00
- Ethylamine _____ 1.00
- Methyl ethyl ketone _____ 141.00

Part B:
- Glycol dimercapto-acetate _____ 1.5
- Tri-n-amylamine _____ .2

While the invention and the advantages thereof have been illustrated by reference to particular materials, it will be understood that other materials may be used in their places. Thus in place of the magnesium compound, which acts as a stabilizer, other basic oxides and carbonates such as lead or zinc be used. The medium thermal carbon black is a reinforcing filler and may be replaced by other conventional reinforcing filler materials such as other carbon blacks, clay or diatomaceous earth. The medium thermal carbon black is preferred for its general physical properties. The aforementioned examples indicate the need for a basic catalyst and the presence of moisture in order to give a greater degree of control over the room temperature reaction. The catalyst used most often is tri-n-amylamine. The size of this molecule makes it less reactive in dehydrohalogenation yet is basic enough to be an effective catalyst and sufficiently volatile to escape during open air vulcanization. The use of water in order to remove the mold release agent from the vulcanized polymer, which is employed during the hydraulic press treatment of the blended rubbery mass may be eliminated by the use of cellophane as a releasing material or the use of a hot air autoclave.

It is to be understood that the term "rubber" as used herein and in the appended claims is employed in a generic sense to designate synthetic rubbery polymers and copolymers which are cross-linkable with polyfunctional compounds capable of reacting therewith so as to effectuate room temperature vulcanization whether or not admixed with pigments, fillers, softeners, peptizers, antioxidants and other like materials.

While specific embodiments of the invention have been described with particularity, it will be evident to those skilled in the art that the invention is not limited thereto but that various modifications may be made without departing from the spirit of the invention as defined by the scope of the appended claims.

Having thus described my invention, what I claim and desire to protect by Letters Patent is:

1. A process for the production of a vulcanized rubbery copolymer selected from the group consisting of hexafluoropropylene-vinylidene fluoride and trifluorochloroethylene-vinylidene fluoride which comprises the steps of mixing said copolymer with a material capable of modifying said copolymer by forming chemically reactive sites thereon, said material selected from the group consisting of ethylamine, propylamine, allylamine, diethylamine, diisopropylamine, di-n-butylamine, diamylamine, diisobutylamine, di-n-octylamine, diallylamine, triethylamine, tripropylamine, triamylamine and tetramethylguanidine heating the mixture to a temperature of from about 250° to 310° F. to provide said chemically reactive sites, cooling said mixture to room temperature, mixing the modified rubbery copolymer with a cross-linking compound selected from the group consisting of hexamethylene dithiol, glycol dimercapto-acetate, piperazine and N,N' dimethyl hexamethylene diamine and an amine catalyst to cause a reaction therebetween, and then allowing said reaction to continue at room temperature, thereby producing a vulcanized rubbery copolymer.

2. A process in accordance with claim 1 wherein said polymer is hexafluoropropylene-vinylidene fluoride.

3. A process in accordance with claim 1 wherein said polymer is trifluorochloroethylene-vinylidene fluoride.

4. A process in accordance with claim 1 wherein said material is ethylamine.

5. A process in accordance with claim 1 wherein said material is diamylamine.

6. A process in accordance with claim 1 wherein said material is triamylamine.

7. A process in accordance with claim 1 wherein said material is diallylamine.

8. A process in accordance with claim 1 wherein said material is diethylamine.

9. A process in accordance with claim 1 wherein said compound is hexamethylene dithiol.

10. A process in accordance with claim 1 wherein said compound is glycol dimercapto-acetate.

11. A process in accordance with claim 1 wherein said compound is piperazine.

12. A process in accordance with claim 1 wherein said compound is hexamethylene diamine.

13. A process for the production of a room temperature vulcanized hexafluoropropylene vinylidene fluoride copolymer which comprises the steps of mixing said copolymer with diallylamine in order to modify said copolymer by forming chemically reacting sites thereon, heating said mixture to a temperature of about 300° F., cooling said mixture to room temperature, mixing the modified copolymer with hexamethylene dithiol and a triamylamine catalyst to cause a reaction therebetween, and then allowing said reaction to continue at room temperature for a period of time sufficient to produce a vulcanized copolymer.

References Cited in the file of this patent

UNITED STATES PATENTS

| | | |
|---|---|---|
| 2,423,032 | Le Beau | June 24, 1947 |
| 2,446,984 | Rogers et al. | Aug. 10, 1948 |
| 2,662,874 | Brown | Dec. 15, 1953 |
| 2,793,200 | West | May 21, 1957 |
| 2,915,481 | Ayers et al. | Dec. 1, 1959 |

OTHER REFERENCES

Moran et al.: "Safe Processing Curing System for Viton Fluoroelastomers," Ind. and Eng. Chem., vol. 51, No. 7, July 1959, pp. 831–832.

Eubank et al.: "Viton in Mechanical Goods," BL–360, October 1959, Elastomers Chemical Department (only page 3 relied on), E. I. du Pont de Nemours and Co. (Inc.), Wilmington 98, Del.